(12) United States Patent
Stumpe

(10) Patent No.: US 6,776,461 B2
(45) Date of Patent: Aug. 17, 2004

(54) BRAKE PRESSURE REGULATING DEVICE FOR VEHICLES

(75) Inventor: Werner Stumpe, Stuttgart (DE)

(73) Assignee: Knorr-Bremse Systeme fuer Nutzfahreuge GmbH, Munich (DE)

( * ) Notice: Subject to any disclaimer, the term of this patent is extended or adjusted under 35 U.S.C. 154(b) by 0 days.

(21) Appl. No.: 10/269,030

(22) Filed: Oct. 11, 2002

(65) Prior Publication Data

US 2003/0090146 A1 May 15, 2003

Related U.S. Application Data

(63) Continuation of application No. PCT/EP01/03517, filed on Mar. 28, 2001.

(30) Foreign Application Priority Data

Apr. 14, 2000 (DE) .......................................... 100 18 515

(51) Int. Cl.$^7$ ................................................ B60T 8/02
(52) U.S. Cl. ................................. 303/15; 303/3; 303/7; 303/118.1
(58) Field of Search ........................ 303/3, 15, 7, 118.1

(56) References Cited

U.S. PATENT DOCUMENTS 4,576,416 A * 3/1986 Müller et al. ................. 303/15
5,358,315 A * 10/1994 Balukin ......................... 303/15
6,079,791 A * 6/2000 Stumpe et al. .................. 303/7
6,132,009 A * 10/2000 Sich et al. ...................... 303/3

FOREIGN PATENT DOCUMENTS

| DE | 19653264 | 6/1998 |
| DE | 19918070 | 12/1999 |
| EP | 0110119 | 6/1986 |
| EP | 0250738 | 3/1991 |

* cited by examiner

Primary Examiner—Matthew C. Graham
(74) Attorney, Agent, or Firm—Crowell & Moring LLP

(57) ABSTRACT

The underlying idea of the invention is to reduce the pressure force resulting from the inlet pressure and the outlet pressure of the back-up valve and affecting the valve body of the back-up valve. The valve body is a switching piston with a first and second switching piston side. The first switching piston side is pressurized by brake operating valve pressure or with brake cylinder pressure and the second switching piston side is pressurized on a first partial surface with brake cylinder pressure and on a second partial surface with brake operating valve pressure. The pressures affecting both sides of the switching piston thus cancel each other out.

22 Claims, 8 Drawing Sheets

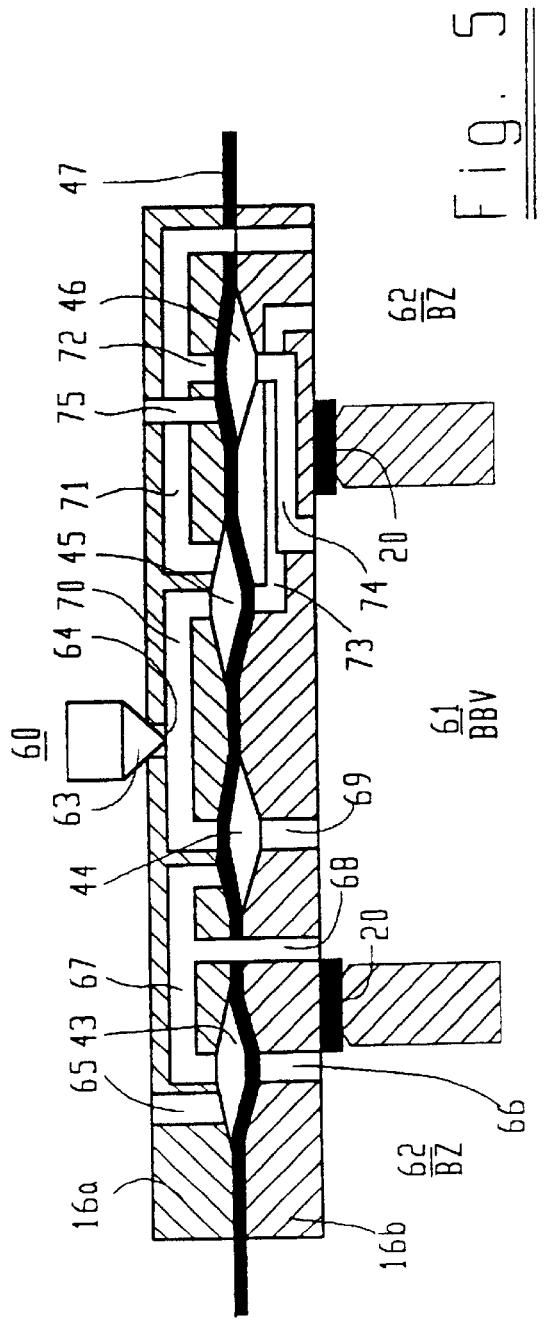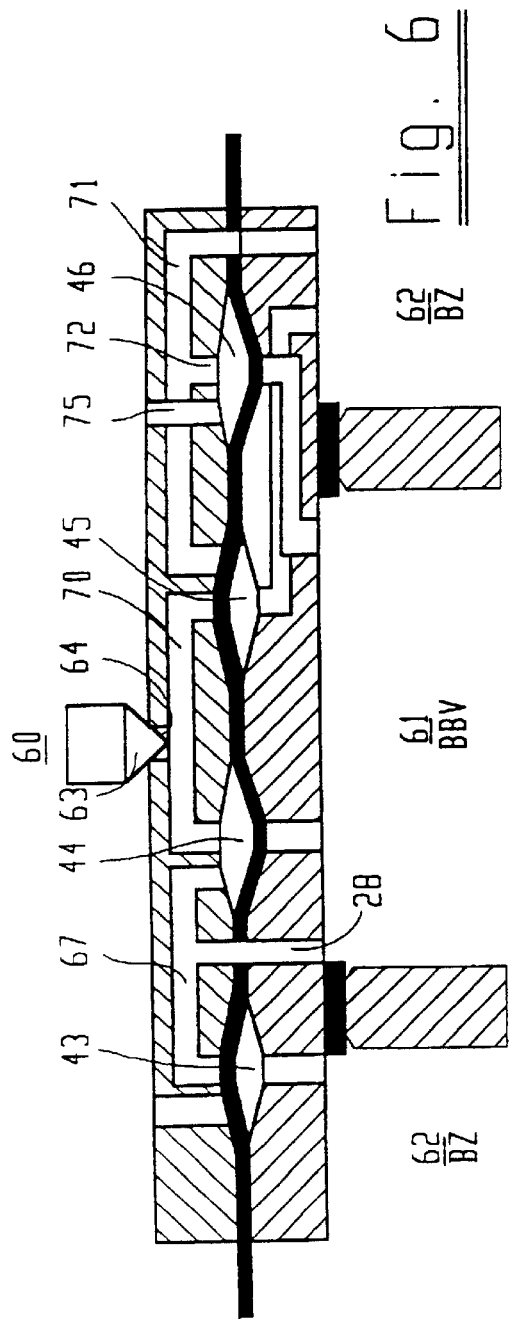

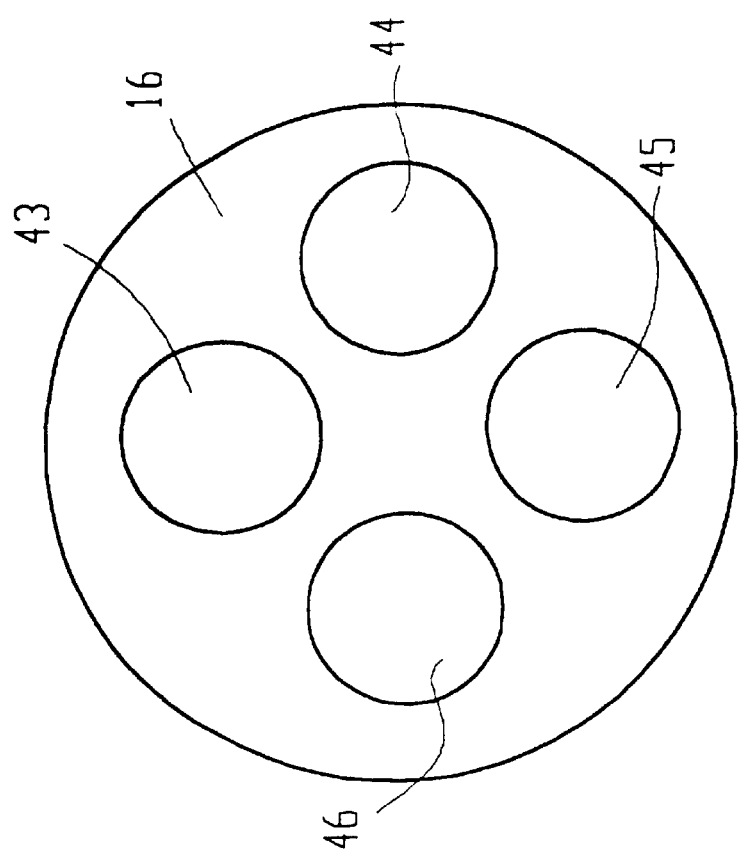

BRAKE PRESSURE REGULATING DEVICE FOR VEHICLES

BACKGROUND AND SUMMARY OF THE INVENTION

This application is a continuation of international patent application No. PCT/EP01/03517, filed Mar. 28, 2001, the entire disclosure of which is hereby incorporated herein by reference. Priority is claimed based on Federal Republic of Germany patent application No. DE 100 18 515.0, filed Apr. 14, 2000

The present invention relates to a brake pressure regulating device for vehicles, especially commercial vehicles.

A brake pressure regulating device having an electronic brake circuit and a pneumatic emergency brake circuit is known from EP 0 110 119 B1. When the brake system is intact, braking control occurs purely electronically, wherein the driver issues a brake command through an operating brake valve and actuates an intake valve and a discharge valve to pressurize or ventilate a brake cylinder. When the brake electronics are intact, an electro-pneumatically controlled solenoid valve, which may be referred to as a "backup valve" and is arranged between a pneumatic outlet of the operating brake valve and that of the brake cylinder, locks the operating brake valve against the brake cylinder. When the brake electronics fail, pressure is supplied to the brake cylinder.

For pilot control, supply pressure is removed and discharged back into the atmosphere. Due to the high pressures, the mechanical stress and the wear of the backup valve are extremely high, especially with a diaphragm valve. This is because the pressure triggered by the operating valve is applied to the inlet of the backup valve, and the brake cylinder pressure acts on the outlet of the backup valve. Only in few instances are the two pressures equal, so that unwanted, loud depressurizing noises may occur when the brake is released. In fact, in a vehicle that is equipped with a traction control system (TCS), the brake operating valve pressure may even be zero when the TCS is engaged. If the vehicle is equipped with an ABS system, the electrically regulated pressure, i.e., the brake cylinder pressure, may be zero when the ABS is engaged. Even at normal brake pressure regulation, the pressures generally differ due to load-dependent regulation. Nevertheless, the backup valve should not open.

A similar brake pressure regulating device is also known from EP 0 250 738 B1.

A mean pressure control device with four locking elements is known from DE 27 57 539 C2.

The purpose of the invention is to provide a brake pressure regulating device that is improved with respect to wear and noise development.

This goal is accomplished with a brake pressure regulating device for vehicles, especially commercial vehicles, with an operating brake valve for presetting a brake pressure, which features an electric outlet for triggering brake pressure valves and a pneumatic outlet. A ventilation and/or bleed valve is provided that may be electrically-triggered by the operating brake valve to pressurize or to bleed a brake cylinder. A control valve, which is connected between the pneumatic outlet of the operating brake valve and the brake cylinder, and which locks the pneumatic outlet against the brake cylinder during electronic brake pressure control, and triggers the electronics during a failure. The control valve features a switching piston, which is pressurized by brake cylinder pressure (BZ) and operating brake valve pressure (BBV). A pressure selection device is assigned to the control valve, which features a high-pressure outlet and a lower pressure outlet, to which the higher or lower of the two pressures (BZ, BBV) is applied. Wherein, a first switching piston side is pressurized precisely with one of the two pressures (BZ, BBV), and the second piston side is pressurized on a partial surface with brake operating valve pressure (BBV) and on another partial surface with brake cylinder pressure (BZ). Advantageous embodiments and further developments of the invention are described herein.

The underlying idea of the invention is to reduce the pressure force resulting from the inlet pressure and the outlet pressure of the backup valve and affecting the "switching element," or the valve body of the backup valve.

Reducing the resulting pressure also reduces mechanical stress, which increases the serviceable life. Furthermore, noise developing from the cylinder space or the so-called "pilot chamber" of the backup valve when the brake is released is reduced. This eliminates the need for an additional muffler. In addition, the invention allows for the use of a compact component for backup activation and deactivation.

According to the invention, the valve body of the backup valve is a switching piston with a first and second switching piston side. The first switching piston side is pressurized with either brake operating valve pressure or with brake cylinder pressure, and the second switching piston side is pressurized on a first partial surface with brake cylinder pressure and on a second partial surface with brake operating valve pressure. Thus, the pressures affecting both sides of the switching piston cancel each other out. As a result, a reduction in the effective pressure force on the switching piston is achieved in comparison to the state of the art.

When the brake system is intact, the backup valve locks, i.e., the switching piston locks the operating brake valve against the brake cylinder, with brake pressure regulation occurring purely electronically through a ventilation valve and a bleed valve. Thus, the brake operating valve pressure is applied to the inlet of the backup valve, and the currently predominating brake cylinder pressure is applied to the outlet. According to the invention, the backup valve ensures that, when the brake system is intact, the greater of the two pressures acts on the first side of the switching piston, and one of the two pressures is applied to partial surfaces of the other side of the switching piston. The resulting pressure force presses the backup valve's switching piston against the valve seat, i.e., the switching piston locks the operating brake valve against the brake cylinder.

Conversely, pneumatic brake pressure must be possible when the electronic brake control system fails or is impaired, i.e., the brake operating valve pressure must be fed through the backup valve to the brake cylinder. In this case, according to the invention, the lower of the two pressures is applied to the first side of the switching piston, thereby ensuring that the switching piston "feeds through" and the pressure connection between the operating brake valve and the brake cylinder opens.

According to a further development of the invention, a pressure selection device is provided, which features a high-pressure outlet and a lower pressure outlet. Depending on which of the two pressures is higher, the brake operating valve pressure is applied to the high-pressure outlet and the brake cylinder pressure to the low-pressure outlet, or vice-versa.

According to a further development of the invention, a solenoid valve is provided that feeds the high-pressure outlet to the first side of the switching piston when electronically controlled operating braking takes place, i.e., when the brake electronics are intact, and that feeds the low-pressure outlet to the first side of the switching piston when there is a problem with the brake electronics. This solenoid valve features an idle open and an idle closed inlet, with the higher pressure being supplied to the idle closed inlet and the lower pressure being supplied to the idle open inlet through the pressure selection device.

The solenoid valve features, for example, a spring-loaded solenoid armature that locks the pressure selection device against the switching piston when the low-pressure outlet is activated and the high-pressure outlet is inactivated.

According to a further development of the invention, the pressure selection device features a high-pressure selection valve and low-pressure selection valve. The high-pressure selection valve may, for example, be a spherical valve with a single sphere, which, depending on the pressure level, feeds the brake operating valve pressure and/or the brake cylinder pressure to the high-pressure outlet. The low-pressure selection valve may, for example, be a spherical valve with connected spherical bodies, between which the low-pressure outlet is located. Depending on the pressure level, one of the two valve bodies blocks the higher of the two pressures, so that the lower of the two pressures is always applied to the low-pressure outlet. Of course, other valve bodies and/or control elements may be used instead of spherical valve bodies.

Alternatively, the pressure selection device may also be comprised of several individual valves. For example, a group of diaphragm valves may be provided, which select the higher or lower pressure of the two inlet pressures, i.e., the brake operating valve pressure and the brake cylinder pressure.

According to a further development of the invention, the pressure selection device may be integrated into the backup valve, especially into the switching piston of the backup valve. This allows for a highly compact construction. Alternatively, a separate arrangement is possible.

The invention will be described in greater detail below, on the basis of exemplary embodiments associated with the drawing.

Other objects, advantages and novel features of the present invention will become apparent from the following detailed description of the invention when considered in conjunction with the accompanying drawings.

BRIEF DESCRIPTION OF THE DRAWINGS

FIG. 5 shows the position of the diaphragm valve shown in FIG. 4 in a first pressure state;

FIG. 6 shows the position of the diaphragm valve shown in FIG. 4 in a second pressure state;

FIG. 7 shows the arrangement of the diaphragm valves shown in FIGS. 4–6 in a schematic view;

DETAILED DESCRIPTION OF THE DRAWINGS

Figure 1:
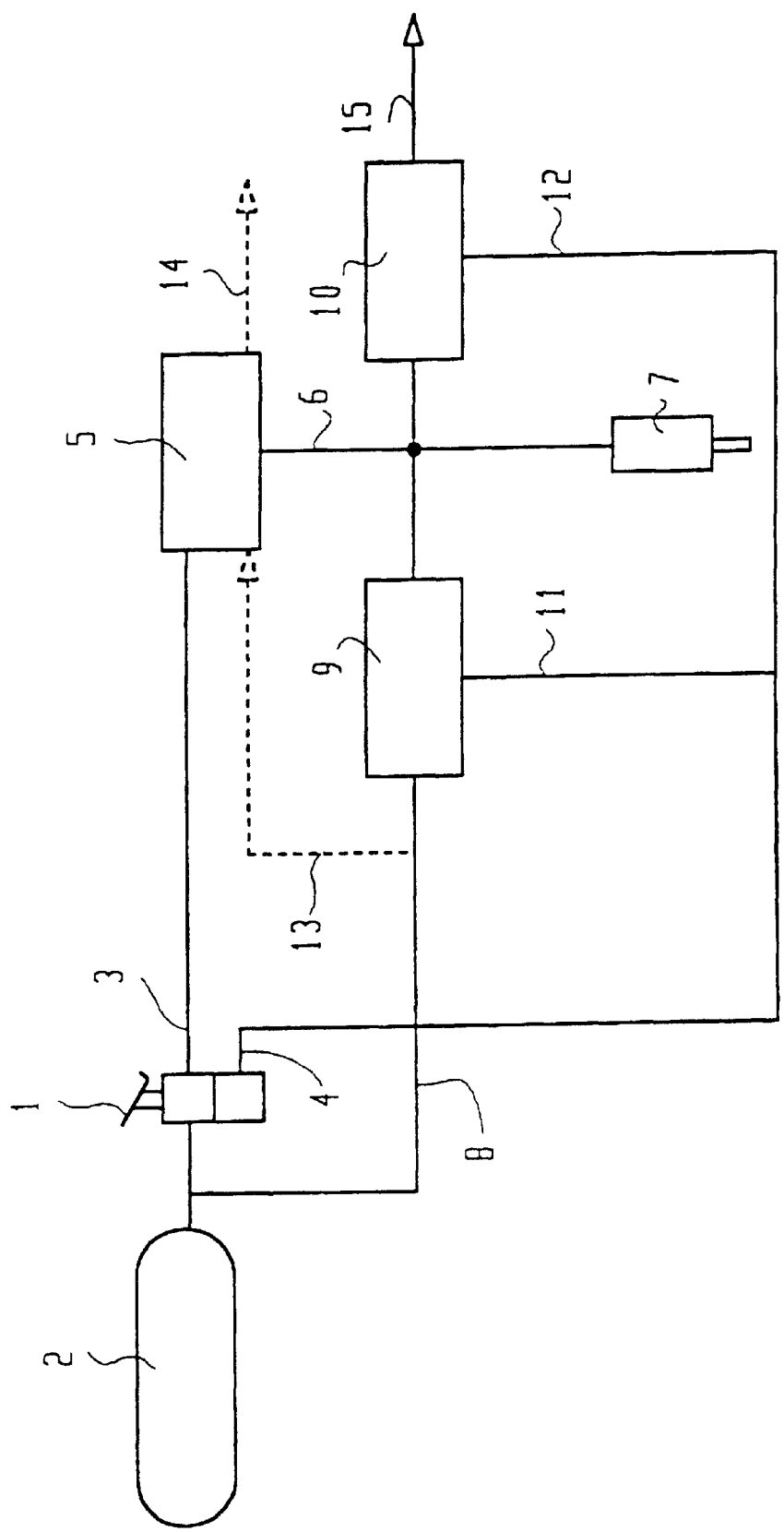
FIG. 1 shows the block diagram of a brake pressure-regulating device according to the invention, especially the configuration of the backup valve.

FIG. 1 shows the block diagram on which the invention is based, having an operating brake valve 1 to which supply pressure is applied from a supply pressure container 2 and which features a pneumatic outlet 3 and an electronic outlet 4. The pneumatic outlet 3 is connected to a backup valve 5, which is connected to a brake cylinder 7 through a pneumatic line 6.

The supply pressure container 2 is connected through a pneumatic line 8 to a ventilation or intake valve 9, which is provided to apply brake pressure to the brake cylinder 7. The brake cylinder 7 is also pressure-connected to a bleed (discharge) valve 10, which permits release of the brake. The intake valve 9 and the discharge valve 10 are each connected through an electrical cable 11 or 12 to the electric outlet 4 of the operating brake valve and, as in the above-mentioned EP 0 110 199, for example, may also be integrated in a shared valve.

When the brake system is intact, brake pressure control occurs purely electronically through the electric outlet 4 and/or the intake valve 9 and the discharge valve 10. As this occurs, the backup valve 5 is in the locking position, locking the brake operating valve pressure against the brake cylinder pressure. If the brake electronics fail, brake pressure is controlled pneumatically through the backup valve 5. The backup valve 5 may be fed through the pneumatic outlet 3 and supplied with supply pressure through a pneumatic line 13. Brake pressure may also be supplied directly through the pneumatic outlet 3. The backup valve 5 and the outlet valve 10 each feature a bleed system 14 or 15.

In electric pressure control, the backup circuit is locked with the support of the supply air and is bled into the atmosphere, as depicted by the bleed system 14.

Figure 2:
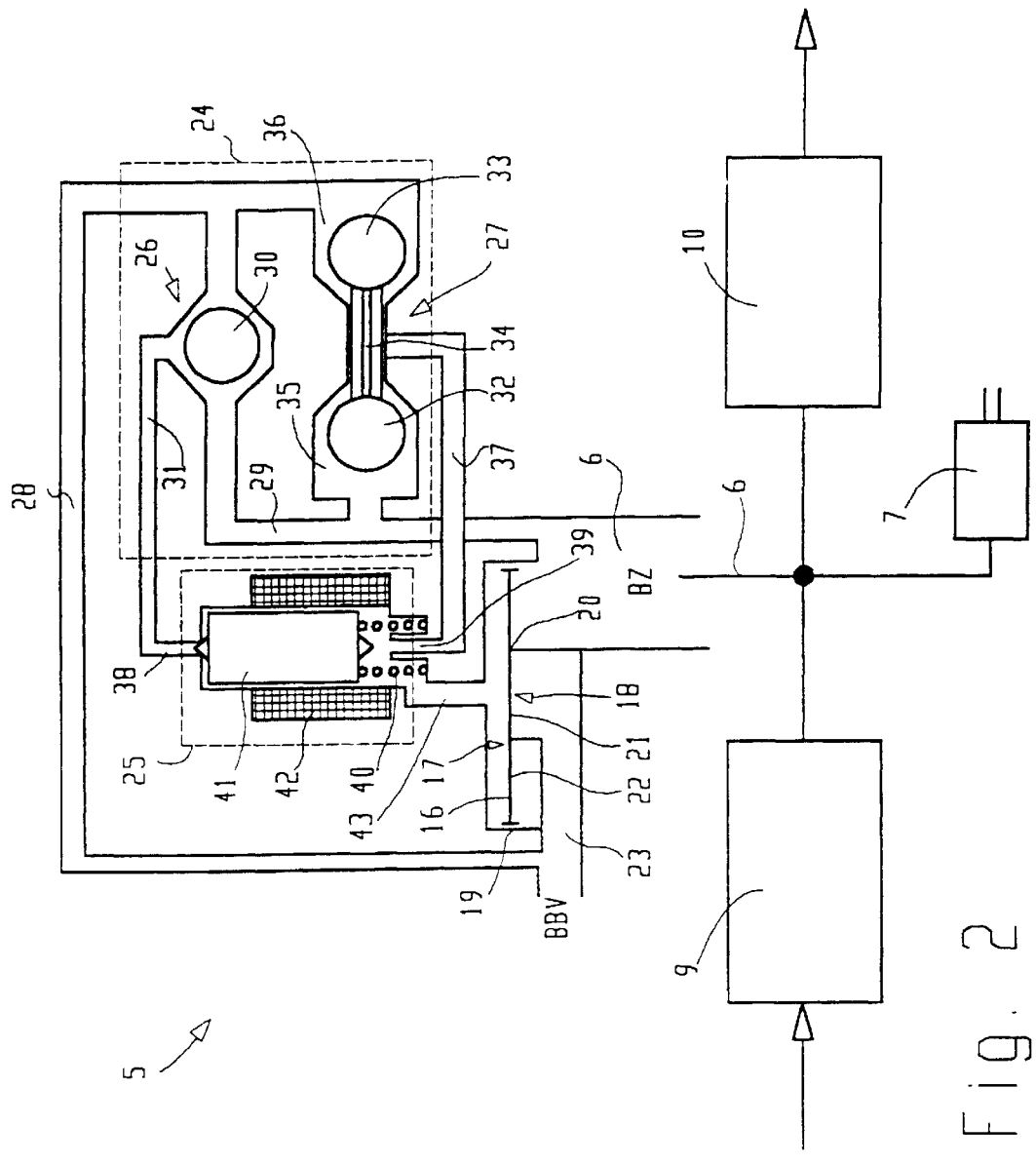
FIG. 2 shows a first exemplary embodiment of the invention with spherical valves.

FIG. 2 shows a first exemplary embodiment of the backup valve 5 shown in FIG. 1. The backup valve 5 features a switching piston 16 with a first piston side 17 and a second piston side 18. The switching piston 16 is displaceable in a cylinder housing 19. In the position depicted here, the switching piston 16 is resting against a valve seat 20. The cylinder housing 19 and the valve seat 20 "divide" the second side of the switching piston 16 into a circular surface 21 and an annular surface 22. The brake operating valve pressure predominating in the line 23 is applied to the circular surface 21. In contrast, the brake cylinder pressure BZ predominating in the pneumatic line 6, which is connected to the brake cylinder 7, is applied to the annular surface 22.

The backup valve 5 also features a pressure selection device 24 and a solenoid valve 25.

The pressure selection device 24 features a high-pressure selection valve 26 and a low-pressure selection valve 27. The brake operating valve pressure BBV is supplied to the high-pressure selection valve 26 through a line 28 and the brake cylinder pressure BZ through a line 29. A valve body 30 of the high-pressure selection valve 26 is pressed into a first or second valve position by the higher of the two pressures, so that the higher of the two pressures is always applied to a high-pressure outlet 26.

The low-pressure selection valve 27 features two valve bodies 32, 33, which are connected to another by a rod 34. Furthermore, a first valve chamber 35 is provided, which is connected to the line 29, i.e., to the pressure BZ predominating in the brake cylinder 7, and to a second valve chamber 36, to which the brake operating valve pressure BBV is applied through the line 28. The low-pressure selection valve 27 assumes a first or a second valve position, depending on which of the two pressures is greater.

A low-pressure outlet 37 is provided between the two valve bodies 32, 33. The lower of the two pressures is always applied to the low-pressure outlet 37.

As an alternative to the exemplary embodiment pictured here, in which the pressure selection device is comprised of two "spherical valves," other valve bodies or diaphragm valves may also be provided, as will be explained in greater detail below.

The solenoid valve 25 is a 3/2 solenoid valve, and features a first inlet 38 connected to the high-pressure outlet 31, and a second inlet 39 connected to the low-pressure outlet 37. A solenoid armature 41, pre-stressed with a spring 40, is also provided, with said anchor being displaceable by a solenoid 42. In the idle starting position of the solenoid valve 25 depicted here, the solenoid armature 41 locks the first inlet 38. The low-pressure outlet 37 is pressure-connected to the first piston side 17 through the second inlet [and] a connecting line 43.

When the solenoid valve is in its activated state, i.e., with a current flowing through it, the solenoid armature 41 locks the inlet 39. In this case, the higher pressure supplied through the inlet 38 is applied at the first piston side 17.

The mode of operation is explained in greater detail below. When the brake system is intact, brake pressure control occurs purely electronically through the intake valve 9 and the discharge valve 10. The brake operating valve pressure predominating in the lines 23 or 28 is locked against the line 6 by the switching piston 16. The solenoid valve 25 is the activated condition, i.e., the solenoid armature 41 is in its "lower" position in which the inlet 39 is locked. Thus, the entire surface of the first side of the switching piston 17 is pressurized with the maximum pressure selected by the high-pressure selection valve. In this case, a distinction is drawn between the following cases:

1. Brake Operating Valve Pressure BBV>Brake Cylinder Pressure BZ

The brake operating valve pressure BBV presses the valve body 30 of the high-pressure selection valve 26 into its "left" position, meaning that the brake operating valve pressure BBV is applied to the high-pressure outlet 31 and/or to the first piston side 17. The brake operating valve pressure BBV is also applied to the circular surface 21. In contrast, the smaller brake cylinder pressure BZ is applied to the annular surface 22. Therefore, the resulting pressure force acting on the switching piston 16 is the product of the brake operating valve pressure BBV and the annular surface 22.

In this case, the low-pressure selection valve 27 is also in its "left" position, i.e., the brake cylinder pressure BZ is applied to the inlet 39 locked by the solenoid armature 41.

2. Brake Operating Valve Pressure BBV<Brake Cylinder Pressure BZ

In this case, the high-pressure selection valve 26 is in its "right" position, meaning that the brake cylinder pressure BZ predominating in the line 6 is applied to the high-pressure outlet 31 and/or to the first piston side 17. The low-pressure selection valve 27 is also in its "right" position, i.e., the brake operating valve pressure BBV predominating in the lines 23 and/or 28 is applied to the low-pressure outlet 37 and/or to the inlet 39 of the solenoid valve 25 locked by the solenoid armature.

In both cases, therefore, it is ensured that the higher of the two pressures is applied to the first piston side 17. The switching piston 16 is thus in the position indicated here, in which the brake operating valve pressure BBV is locked against the brake cylinder pressure BZ. If the brake electronics fail, the solenoid armature 41 is in the "inactivated" or idle position shown in FIG. 2. The spring 40 presses the solenoid armature 41 "upward" and locks the inlet 38. In this case, the lower of the two pressures is applied to the first side 17 of the switching piston 16.

If the driver steps on the brake pedal when the brake electronics fail, operating brake valve pressure is supplied through the line 23. In this case, the brake operating valve pressure is higher than the brake cylinder pressure. Accordingly, the switching piston 16 is pushed "upward," i.e., the brake operating valve pressure flows to the brake cylinder 7 through the lines 23 and/or 6.

Thus, the backup valve 5, together with the switching piston 16, monitors the flow of air between the operating brake valve and the brake cylinder. During normal operation, i.e., when brake pressure is electronically controlled, the opening is divided. In an emergency, i.e., when there is no electric pressure control, the connection to the brake cylinder 7 is opened when the operating brake valve is actuated. Locking with the aid of the switching piston 16 occurs in that the maximum pressure, i.e., the brake operating valve pressure BBV or the brake cylinder pressure BZ, is applied to the first piston side, and while the brake operating valve pressure BBV is applied to one partial surface 21 and the brake cylinder pressure BZ to the other partial surface 22 on the other piston side 18.

In other words, a shuttle valve (MAX value; OR function) and an emergency valve (MIN value; AND function) are provided in the exemplary embodiment shown in FIG. 2. Both valves are pressurized on one side by the pressure from the operating brake valve, and on the other side by the electrically controlled pressure. The respective MAX and MIN pressures are supplied to the solenoid valve. A connection exists between the solenoid valve 25 and the switching piston of the backup valve.

Thus, in FIG. 2 the pressure from the operating brake valve is supplied to one side of a shuttle valve (top), and the electrically controlled pressure to the other. Consequently, the maximum system pressure is always applied to one side of the solenoid valve. The minimum system pressure is selected by a corresponding valve (bottom), in that the maximum pressure locks one valve section and, therefore, the minimum pressure is applied to the other side of the solenoid valve. Instead of the spherical valves, diaphragm valves may also be used.

Figure 3:
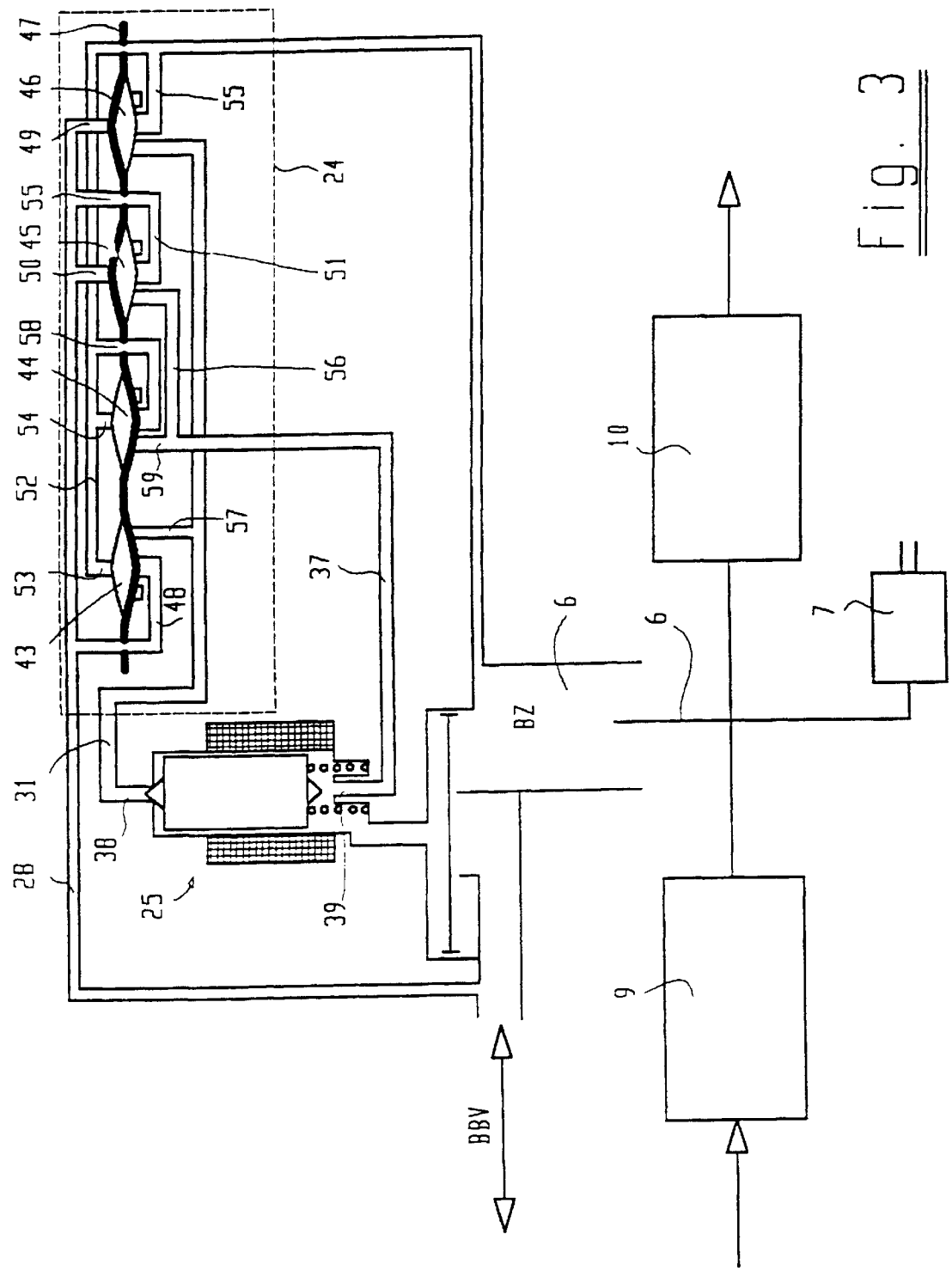
FIG. 3 shows an exemplary embodiment with diaphragm valves.

FIG. 3 shows an exemplary embodiment in which the pressure selection device 24 is comprised of a first diaphragm valve 43, a second diaphragm valve 44, a third diaphragm valve 45 and a fourth diaphragm valve 46. Here the valves 43–46 feature a one-piece diaphragm 47. The brake operating valve pressure BBV is applied to the first diaphragm valve 43 through a stub line 48 and to the fourth diaphragm valve 46 through a stub line 49. In addition, the brake operating valve pressure is applied to the third diaphragm valve 45 through stub lines 50, 51.

The line 6 is connected to a line 52 from which stub lines 53 and 54 branch off to the first diaphragm valve 43 or from the second diaphragm valve 44. The lines 6 and/or 52 are connected to the fourth diaphragm valve 46 through a line 55. Thus, in the valve configuration shown there is a pressure connection among the lines 6, 52, 55, the fourth diaphragm valve 46, and the high-pressure outlet 31 of the pressure selection device 24. Therefore, the brake cylinder pressure BZ is applied to the inlet 38 of the solenoid valve 25.

A stub line 55, which is connected to a line 56 through the third diaphragm valve 45 and to the pressure selection device 24 through the low-pressure outlet 37, branches off from the line 28. Thus, the brake operating valve pressure BBV is applied to the inlet 39 of the solenoid valve 25.

If the brake operating valve pressure BBV is higher than the brake cylinder pressure, each of the diaphragm valves 43–46 switches to the other valve position (not shown). The brake operating valve pressure BBV then reaches the first diaphragm valve 43 through lines 28, 48 and, from there, reaches the high-pressure outlet 24 through a stub line 57. Thus, the fourth diaphragm valve 46 locks the high-pressure outlet 24 against the line 55.

Accordingly, the brake cylinder pressure BZ reaches the second diaphragm valve 44 through the lines 6 and a stub line 58 and, from there, reaches the low-pressure outlet 37 through a stub line 59.

Thus, four valve elements 43–46 for max/min selection (equalizing) are provided in the exemplary embodiment shown in FIG. 3. Each of the valve elements 43–46 comprises, for example, a switching diaphragm, with its one side being pressurized by the switching pressure, while the other side controls the flow through an air channel. Two of these valves are controlled by the brake cylinder channel and the other two by the operating brake valve channel. The channels are logically interconnected in such a way as to provide a separation into max/min pressure.

In other words, FIG. 3 shows an exemplary embodiment for min/max selection by logical interconnection of four switching elements. Two of the switching diaphragms are switched by the brake operating valve pressure and the other two by the electrically controlled pressure. When the brake operating valve pressure is lower, the opening for the higher electrically controlled pressure in one switching element 47 is released and fed to the "maximum side" of the solenoid valve. In the second switching element 45, the "minimum side" of the solenoid valve is connected to the lower operating brake valve pressure. The switching elements 43, 44 lock the lower transitions with the higher electrically controlled pressure. If the electrically controlled pressure becomes smaller than the brake operating valve pressure, the left and right switching elements switch positions. The then higher operating brake valve pressure is supplied to the "maximum side" of the solenoid valve, while the "minimum side" is connected to the electrically controlled pressure.

In the exemplary embodiments shown in FIGS. 2 and 3, the higher of the two pressures, operating brake valve pressure and brake cylinder pressure, is selected and used as switching pressure. Separately arranged max/min selection valves are used for this purpose. Pilot control is achieved with a 3/2 solenoid valve.

By contrast, the max/min selection valves are integrated into the switching piston in the following exemplary embodiments depicted in FIGS. 4–10. This reduces the necessary air channels in the housing. Furthermore, a 2/2 solenoid valve is sufficient in these exemplary embodiments.

Figure 4:
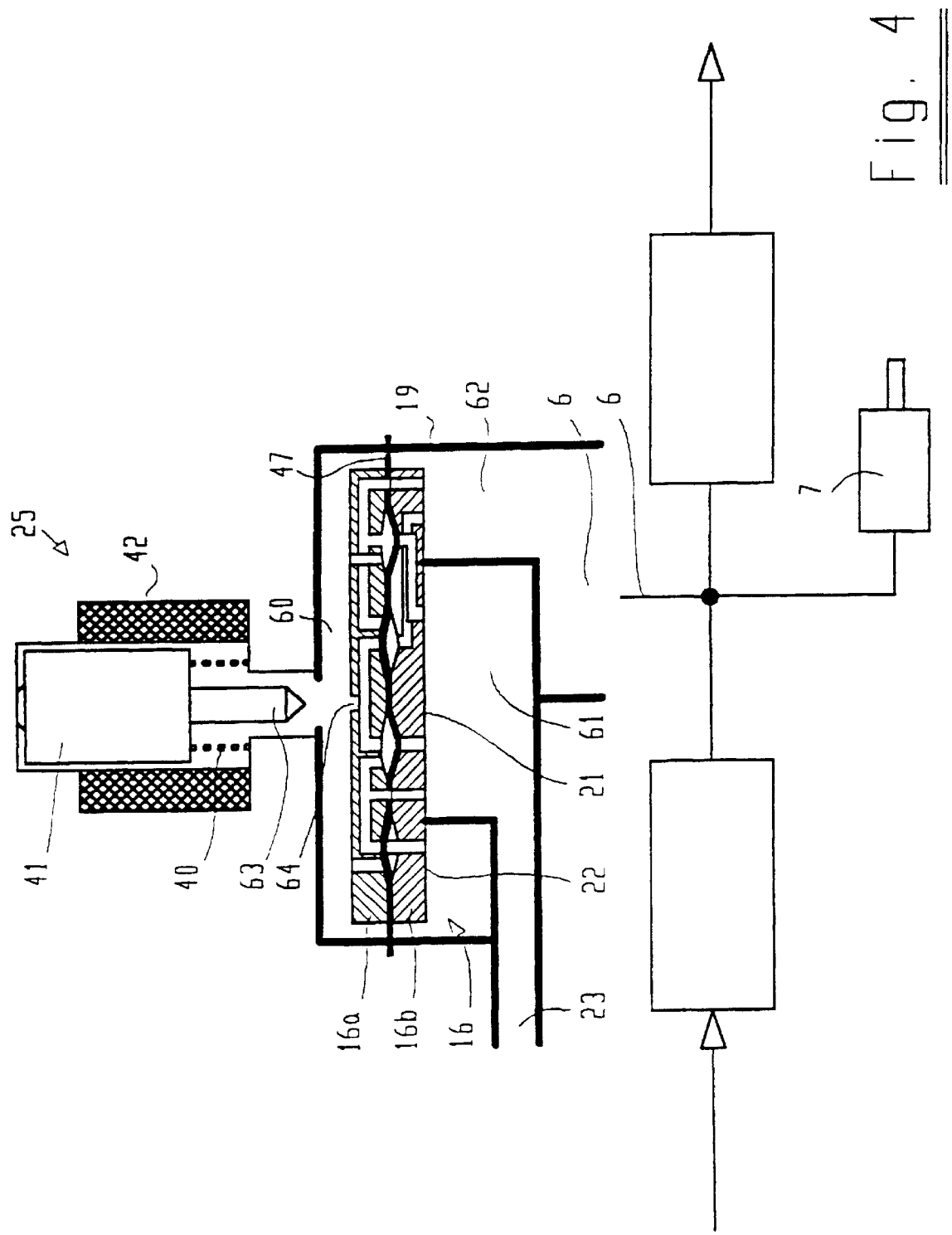
FIG. 4 shows an exemplary embodiment with a pressure selection device integrated into the switching piston.

FIG. 4 depicts a first exemplary embodiment in which the pressure selection device is integrated into the switching piston 16 which, in this case, comprises an upper switching piston half 16a and a lower switching piston half 16b. The elastic diaphragm 47, which protrudes laterally from the switching piston 16 and is hermetically connected to the cylinder housing 19, is wedged between the two switching piston halves 16a, 16b. The switching piston 16 and/or the diaphragm 47 thus "divide" the cylinder housing 19 into an upper cylinder space 60 and two lower cylinder spaces 61, 62. When the switching piston 16 is in the position shown in FIG. 4, the cylinder space 61 is bordered by the circular surface 21 and flows into the line 23. The cylinder space 62 is bordered by the annular surface 22 of the switching piston 16 and flows into the pneumatic line 6, which is connected to the brake cylinder 7.

Details concerning the switching piston 16 are explained in greater detail below, in connection with the enlarged depictions in FIGS. 5 and 6.

In FIG. 4, the solenoid valve 25 features a solenoid armature 41, which, as in the exemplary embodiment shown in FIG. 2, is prestressed with a spring 40. A valve tappet 63 is provided on the lower side of the solenoid armature 41. In the activated condition, the solenoid armature 41 is pulled downward and against the spring force by the solenoid 42, so that the valve tappet 63 closes an opening 64 provided on the upper side of the switching piston 16. In contrast to the exemplary embodiments shown in FIGS. 2 and 3, the solenoid valve 25 depicted in FIG. 4 is a "unilaterally" operating solenoid valve.

FIG. 5 depicts an enlarged view of the switching piston 16 shown in FIG. 4. In keeping with the position of the switching piston shown in FIG. 4, the lower switching piston half 16b rests on the valve seat 20 or the line 23. Consequently, operating brake valve pressure predominates in the lower cylinder space 61. By contrast, brake cylinder pressure predominates in the annular lower cylinder space 62 (see FIG. 4).

Four diaphragm valves 43–46 are integrated into the switching piston 16.

In the position of the diaphragm valves 43–46 shown in FIG. 5, the brake operating valve pressure predominating in the lower cylinder space 61 is greater than the brake cylinder pressure predominating in the annular cylinder space 62. Accordingly, the diaphragm of diaphragm valves 43 and 45 rests against the lower switching piston half 16b, and the diaphragm 47 of diaphragm valves 44 and 46 against the upper switching piston half 16a.

The first diaphragm valve 43 is pressure-connected to the upper cylinder space 60 through a stub line 65, to the lower annular cylinder space 62 through a stub line 66, and to the second diaphragm valve 44 through a connecting line 67. A stub line 68 leads from the two lines connecting the two diaphragm valves 43, 44 into the lower cylinder space 61.

The second diaphragm valve 44 is also connected to the lower cylinder space through a stub line 69. The second diaphragm valve 44 and the third diaphragm valve 45 are connected by a connecting line 70. Here the opening 64, which is also pressure-connected to the connecting line 70, is locked by the valve tappet 63, i.e., in FIGS. 5 and 6 the solenoid valve 25 (compare to FIG. 4) is in its active condition.

The third diaphragm valve 45 is pressure-connected to the annular cylinder space 62 through a connecting line 71 and to the fourth diaphragm valve 46 through a stub line 72. In addition, another connecting line 73 is provided between the third diaphragm valve 45 and the annular cylinder space 62.

The fourth diaphragm valve 46 is pressure-connected to the annular cylinder space 62 through the stub line 72 and/or through the connecting line 71, and to the cylinder space 61 through another connecting line 74.

Furthermore, a stub line 75 leads from the fourth diaphragm valve 46 into the upper cylinder space 60.

The brake operating valve pressure BBV predominates in the upper cylinder space when the solenoid valves 43–46 are in the position depicted in FIG. 5. This is due to the fact that a pressure connection exists between the lower cylinder space 61 and the upper cylinder space 60 via the stub line 68, the connecting line 67, the first diaphragm valve 43 and the stub line 65. However, the lower annular cylinder space 62 is locked against the upper cylinder space by means of the diaphragm valves 43, 44 and 45.

FIG. 6 depicts the switching piston 16, with each of the diaphragm valves located in its other position. These valve positions are then present when the brake cylinder pressure BZ that predominates in the lower cylinder space 62 is higher than the brake operating valve pressure BBV that predominates in the lower cylinder space 61. In this case, the higher of the two pressures, i.e., the brake cylinder pressure, predominates in the upper cylinder space 60. This is due to the fact that when the diaphragm valves 43–46 are in the position depicted in FIG. 6, a pressure connection exists through the connecting line 71, the stub line 72, the diaphragm valve 46 and the stub line 75. However, the cylinder space 61 is locked against the upper cylinder space 60 by means of the diaphragm valves 43, 44 and 45 and the valve tappet 63.

Thus, in the exemplary embodiment shown in FIGS. 4–6, it is also ensured that when the brake electronics are intact, i.e., when the solenoid valve 25 is active, the higher of the two pressures BBV or BZ always predominates in the upper cylinder space 60.

If the brake electronics and/or the solenoid valve 25 fail, the solenoid armature goes into its base position shown in FIG. 4, meaning that the opening 64 is not locked. In this case, the diaphragm valves 43–46 ensure that the lower of the two pressures BBV and BZ predominates in the upper cylinder space. In this case, too, a distinction is drawn between the following two cases:

Operating Brake Valve Pressure BBV>Brake Cylinder Pressure BZ (FIG. 5)

When the solenoid valve 25 is not activated, a pressure connection exists between the annular cylinder space 62 and the upper cylinder space 60 via the connecting line 71, the solenoid valve 45, the connecting line 70 and the opening 64, which in this case is open.

If, in the event of failure of the brake electronics, pressure is applied pneumatically through the cylinder space 61, a pressure connection exists between the cylinder spaces 61 and 62 via the stub line 68, the connecting line 67, the solenoid valve 43, the stub line 65, the upper cylinder space 60, the opening 64, the connecting line 70, the solenoid valve 45 and the connecting line 71. In addition, the switching piston 16 is pressed upward by the brake operating valve pressure BBV, so that compressed air may flow directly from the cylinder space 61 across the valve seat 20, into the cylinder space 62, and on to the brake cylinder 7.

Operating Brake Valve Pressure BBV<Brake Cylinder Pressure BZ (FIG. 6)

When the solenoid valve 25 is not activated, a pressure connection exists between the cylinder space 61 and the upper cylinder space 60 via the stub line 28, the connecting line 67, the solenoid valve 44, the connecting line 70 and the opening 64.

When the solenoid valve 45 is activated, i.e., when the opening 64 is closed by the valve tappet 63, this always ensures that the higher of the two pressures predominates in the upper cylinder space 60, i.e., that the piston 16 is pressed downward against the valve seat 20. This ensures that, even during failure of the brake electronics, the line 23 is locked against the brake cylinder when the operating brake valve is not actuated.

On one side, the "controlling pressure" impinges on the four switching elements 43–46. On the other side of each switching element, the flow from one channel into another is either permitted or blocked, depending on the level of pressure at the target location. The switching elements are controlled in pairs by the brake cylinder pressure BZ or by the brake operating valve pressure BBV. If the brake cylinder pressure BZ is lower than the brake operating valve pressure BBV (FIG. 5), the brake operating valve pressure BBV flows through the switching element 43 and into the control space, i.e., the cylinder space 60 of the switching piston 16. Because the solenoid valve prevents drainage through the centered "min channel," i.e., through the opening 64, [and] through the switching element 44 (third from left) to the BZ pressure, the switching piston 16 remains in the locking position.

If the pressure relationship between BZ and BBV changes (BBV<BZ), the switching element 46 releases the flow of BZ pressure into the control chamber 60 of the switching piston. Then the connection to the lower BBV pressure through the switching element 44 remains interrupted by the solenoid valve.

If the solenoid valve releases the "min channel," i.e., the opening 64, the pressure may flow out of the control space 60 of the switching piston 16, and the effect of the higher pressure pushes the switching piston 16 and its integrated switching elements 43–46 upward. As a result, the connection between BBV and BZ is reestablished. In this process, it is important that a larger volume of air be able to flow out through the "min channel" than through one of the "max channels" in the control chamber of the switching piston.

It should be noted that the switching elements depicted in FIGS. 5 and 6, i.e., the diaphragms, may also be part of the diaphragm of the switching piston 16, as shown in FIG. 4. Alternatively, the switching element may also consist of individual plate valves.

FIG. 7 shows a schematic view of a possible arrangement of the diaphragm valves 43–46 depicted in FIGS. 4–6. The switching elements or diaphragm valves 43–44 may either be arranged adjacent to one another, as shown in FIGS. 4–6, or may be "placed along a circle," as shown in FIG. 7.

Figure 8:
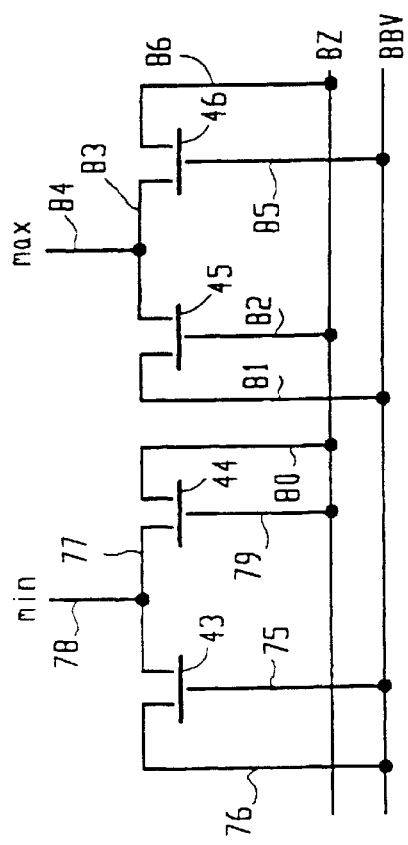
FIG. 8 shows another exemplary embodiment in a schematic view.
Figure 9:
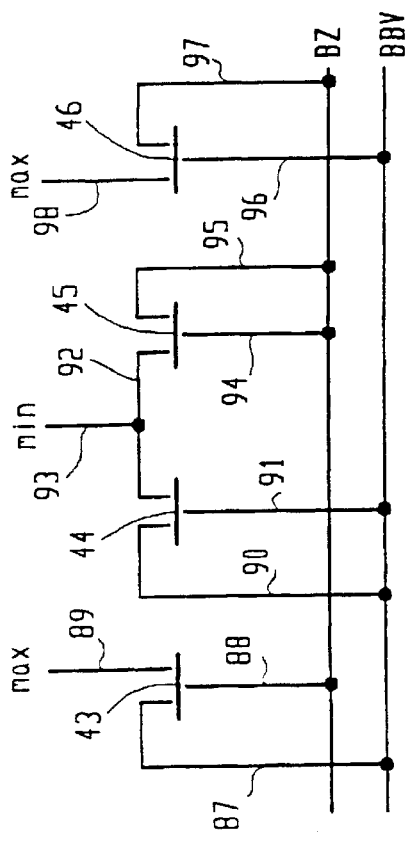
FIG. 9 shows a further exemplary embodiment in a schematic view.

FIGS. 8 and 9 show a schematic view of two additional switching variants for the diaphragm valves 43–46.

FIG. 8 schematically depicts the selection of the max/min pressure from the impinging operating brake valve pressure BBV or brake cylinder pressure BZ, as well as channeling into "min" and "max."

In contrast to the exemplary embodiment shown in FIGS. 4–6, the low-pressure outlets or the high-pressure outlets, here identified by "min" or "max," are combined in FIG. 8. The first diaphragm valve 43 is connected to the brake operating valve pressure BBV through two separate lines 75, 76. In addition, there is a pressure connection to the second diaphragm valve 44 through a connecting line 77. The joint connecting line 77 is pressure-connected to the low-pressure outlet 78. Two separate lines 79, 80 lead from the second diaphragm valve 44 into the cylinder space in which the brake cylinder pressure BZ predominates. The third diaphragm valve 45 is connected to BBV through a line 81 and to BZ through a line 82. The third and fourth diaphragm valves are connected through a connecting line 83 to which the high-pressure outlet 84 is connected. The fourth diaphragm valve 46 is pressure-connected to BBV through a line 85 and to BZ through a line 86.

In contrast, only the "min channel" is combined in FIG. 9, which is sufficient for its operation and integration into the switching piston. Some of the individual outlets are also combined. The first diaphragm valve 43 is connected to BBV and BV, respectively, through lines 87, 88. In addition, the diaphragm valve 43 features a high-pressure outlet 89. The second diaphragm valve 44 is connected to BBV through lines 90, 91. In addition, between the second diaphragm valve 44 and the third diaphragm valve 45 a connecting line 92 is provided from which a joint low-pressure outlet 93 branches off. The third diaphragm valve 45 is also connected to BZ through two separate lines 94, 95. The fourth diaphragm valve 46 is connected to BBV through a line 96 and to BZ through a line 97. The diaphragm valve 46 also features a high-pressure 98.

Figure 10:
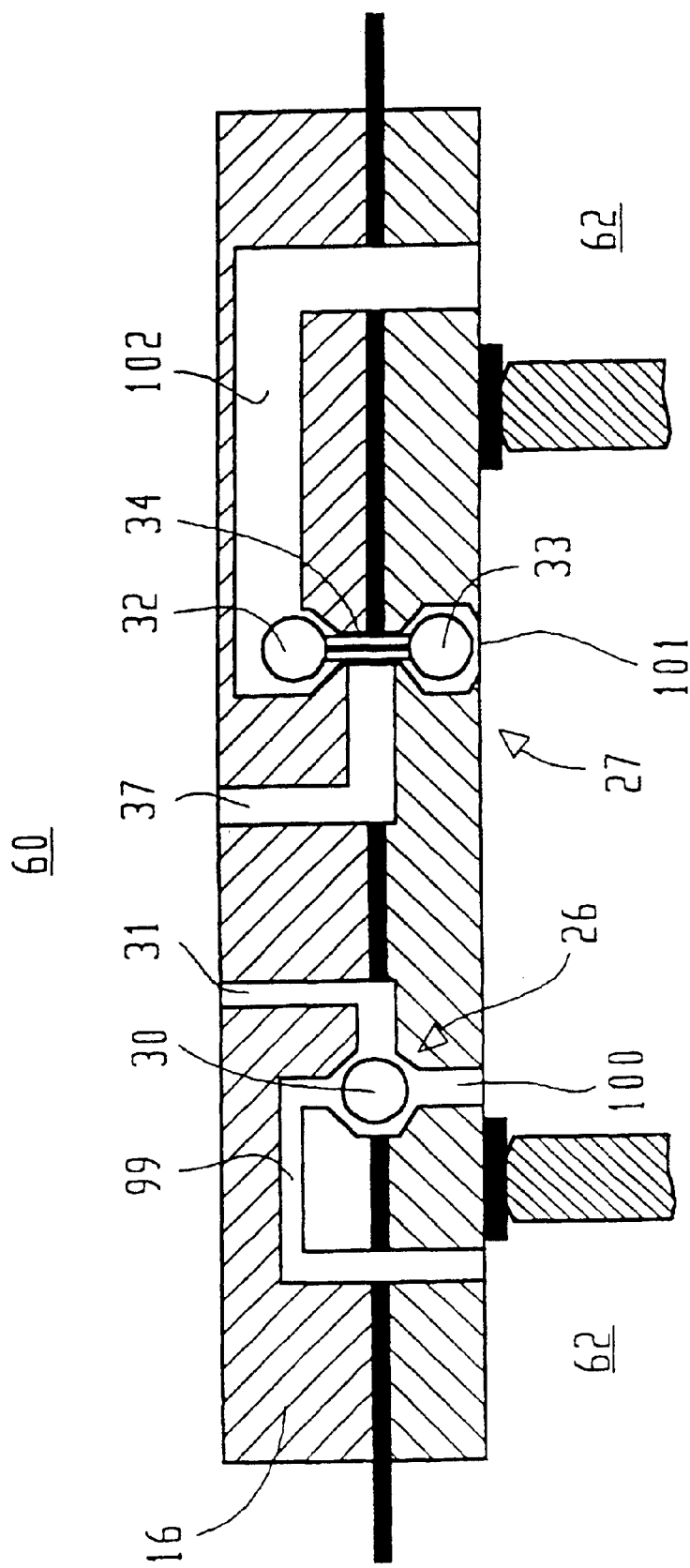
FIG. 10 shows an exemplary embodiment with spherical valves integrated into the switching piston.

FIG. 10 shows another exemplary embodiment with a pressure selection device integrated into the switching piston 16. In this case, a high-pressure selection valve 26 and low-pressure selection valve 27 are also provided. As in FIG. 2, the high-pressure selection valve 26 features a valve body 30 and the low-pressure selection valve 27 features two valve bodies 32, 33 connected to one another by a rod 34. The high-pressure selection valve 26 is connected to the annular cylinder space 62 through a line 99 and to the cylinder space 61 through a stub line 100. Furthermore, a high-pressure outlet 31 is provided that connects the upper cylinder space 60 with the high-pressure selection valve 26. The low-pressure selection valve 27 is pressure-connected to the cylinder space 61 through an opening 101 and to the annular cylinder space 62 through a line 102. Furthermore, a pressure connection exists between the low-pressure selection valve 27 and the upper cylinder space 60 through the low-pressure outlet 37. As with the exemplary embodiment depicted in FIG. 2, a distinction is drawn between the two cases:

Operating Brake Valve Pressure BBV>Brake Cylinder Pressure BZ

In this case, the valve body 30 of the high-pressure selection valve 26 closes the line 99. Consequently, a pressure connection exists between the upper cylinder space 60 and the cylinder space 61, meaning the higher pressure BBV predominates in the upper cylinder space.

BBV<BZ

In this case, the high-pressure selection valve closes the stub line 100, i.e., a pressure connection exists between the annular cylinder space 62 and the upper cylinder space 60 through the line 99 and the high-pressure selection valve 26.

Thus, there is identical "switching operation" of the switching piston 16, as is the case with the diaphragm valves depicted in FIGS. 4–6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pressure regulating device for commercial vehicles, comprising:
   an operating brake valve for presetting a brake pressure, the operating brake valve having an electric outlet and a pneumatic outlet;
   at least one of a ventilation and bleed valve electrically triggerable by the operating brake valve to either pressurize or bleed a brake cylinder;
   a control valve, coupled between the pneumatic outlet and the brake cylinder, said control valve locking the pneumatic outlet against the brake cylinder during electronic brake pressure control, said control valve also triggering electronics during a failure;
   wherein said control valve comprises:
      a switching piston pressurized by a brake cylinder pressure (BZ) and an operating brake valve pressure (BBV);
      a pressure selection device, the pressure selection device including a high-pressure outlet and a low-pressure outlet to which a higher or lower of the brake cylinder pressure (BZ) and the operating brake valve pressure (BBV) are applied;
      wherein a first switching piston side is pressurized precisely by pressure from one of the high pressure outlet and the low pressure outlet, and a second piston side is pressurized on a partial surface with the brake operating valve pressure (BBV) and, on another partial surface, with the brake cylinder pressure (BZ).

2. The brake pressure regulating device according to claim 1, further comprising:
   a solenoid valve assigned to the control valve, the solenoid valve feeding the higher of the brake cylinder pressure (BZ) and the operating brake valve pressure (BBV) to the first switching piston side when electronically controlled operating braking takes place, and feeding lower of the brake cylinder pressure (BZ) and the operating brake valve pressure (BBV) to the first switching piston when the brake electronics fail.

3. The brake pressure regulating device according to claim 2, wherein the solenoid valve has a spring-loaded solenoid armature that locks the low-pressure outlet in an active condition and the high-pressure outlet in an inactive condition.

4. The brake pressure regulating device according to claim 1, wherein the pressure selection device is integrated into the switching piston.

5. The brake pressure regulating device according to claim 2, wherein the pressure selection device is integrated into the switching piston.

6. The brake pressure regulating device according to claim 3, wherein the pressure selection device is integrated into the switching piston.

7. The brake pressure regulating device according to claim 1, wherein the pressure selection device is arranged separately from the switching piston.

8. The brake pressure regulating device according to claim 2, wherein the pressure selection device is arranged separately from the switching piston.

9. The brake pressure regulating device according to claim 3, wherein the pressure selection device is arranged separately from the switching piston.

10. The brake pressure regulating device according to claim 1, wherein the pressure selection device comprises a high-pressure selection valve and a low-pressure selection valve, wherein the high-pressure selection valve includes a single valve body and the lower of the brake cylinder pressure (BZ) and the operating brake valve pressure (BBV) is locked against the high-pressure outlet, and wherein the low-pressure selection valve includes a double-acting valve body, which locks the higher of the brake cylinder pressure (BZ) and the operating brake valve pressure (BBV) against the low-pressure outlet.

11. The brake pressure regulating device according to claim 2, wherein the pressure selection device comprises a high-pressure selection valve and a low-pressure selection valve, wherein the high-pressure selection valve includes a single valve body and the lower of the brake cylinder pressure (BZ) and the operating brake valve pressure (BBV) is locked against the high-pressure outlet, and wherein the low-pressure selection valve includes a double-acting valve body, which locks the higher of the brake cylinder pressure (BZ) and the operating brake valve pressure (BBV) against the low-pressure outlet.

12. The brake pressure regulating device according to claim 3, wherein the pressure selection device comprises a high-pressure selection valve and a low-pressure selection valve, wherein the high-pressure selection valve includes a single valve body and the lower of the brake cylinder pressure (BZ) and the operating brake valve pressure (BBV) is locked against the high-pressure outlet, and wherein the low-pressure selection valve includes a double-acting valve body, which locks the higher of the brake cylinder pressure (BZ) and the operating brake valve pressure (BBV) against the low-pressure outlet.

13. The brake pressure regulating device according to claim 4, wherein the pressure selection device comprises a high-pressure selection valve and a low-pressure selection valve, wherein the high-pressure selection valve includes a single valve body and the lower of the brake cylinder pressure (BZ) and the operating brake valve pressure (BBV) is locked against the high-pressure outlet, and wherein the low-pressure selection valve includes a double-acting valve body, which locks the higher of the brake cylinder pressure (BZ) and the operating brake valve pressure (BBV) against the low-pressure outlet.

14. The brake pressure regulating device according to claim 7, wherein the pressure selection device comprises a high-pressure selection valve and a low-pressure selection valve, wherein the high-pressure selection valve includes a single valve body and the lower of the brake cylinder pressure (BZ) and the operating brake valve pressure (BBV) is locked against the high-pressure outlet, and wherein the low-pressure selection valve includes a double-acting valve body, which locks the higher of the brake cylinder pressure (BZ) and the operating brake valve pressure (BBV) against the low-pressure outlet.

15. The brake pressure regulating device according to claim 1, wherein the pressure selection device has valve bodies that are spherical.

16. The brake pressure regulating device according to claim 1, wherein the pressure selection device is comprised of several diaphragm valves.

17. The brake pressure regulating device according to claim 16, wherein the diaphragm valves have a one-piece diaphragm.

18. The brake pressure regulating device according to claim 16, wherein the switching piston is comprised of two switching piston halves, between which a diaphragm is wedged.

19. The brake pressure regulating device according to claim 17, wherein the switching piston is comprised of two switching piston halves, between which a diaphragm is wedged.

20. The brake pressure regulating device according to claim 18, wherein the diaphragm protrudes laterally from the switching piston and is hermetically connected to an inner side of a housing of the control valve in which the switching piston is arranged.

21. The brake pressure regulating device according to claim 19, wherein the diaphragm protrudes laterally from the switching piston and is hermetically connected to an inner side of a housing of the control valve in which the switching piston is arranged.

22. The brake pressure regulating device according to claim 1, wherein one of the partial surfaces is a circular surface and the other partial surface is an annular surface.

* * * * *